Nov. 6, 1928.
M. S. FRANKLE
1,690,723
DEFLECTOR FOR MOTOR VEHICLE HOT AIR HEATERS
Filed Oct. 7, 1927
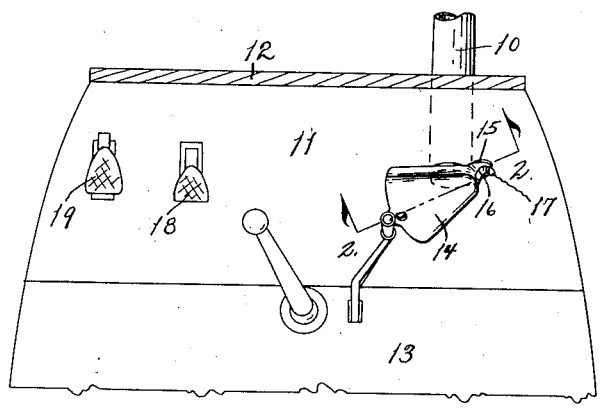
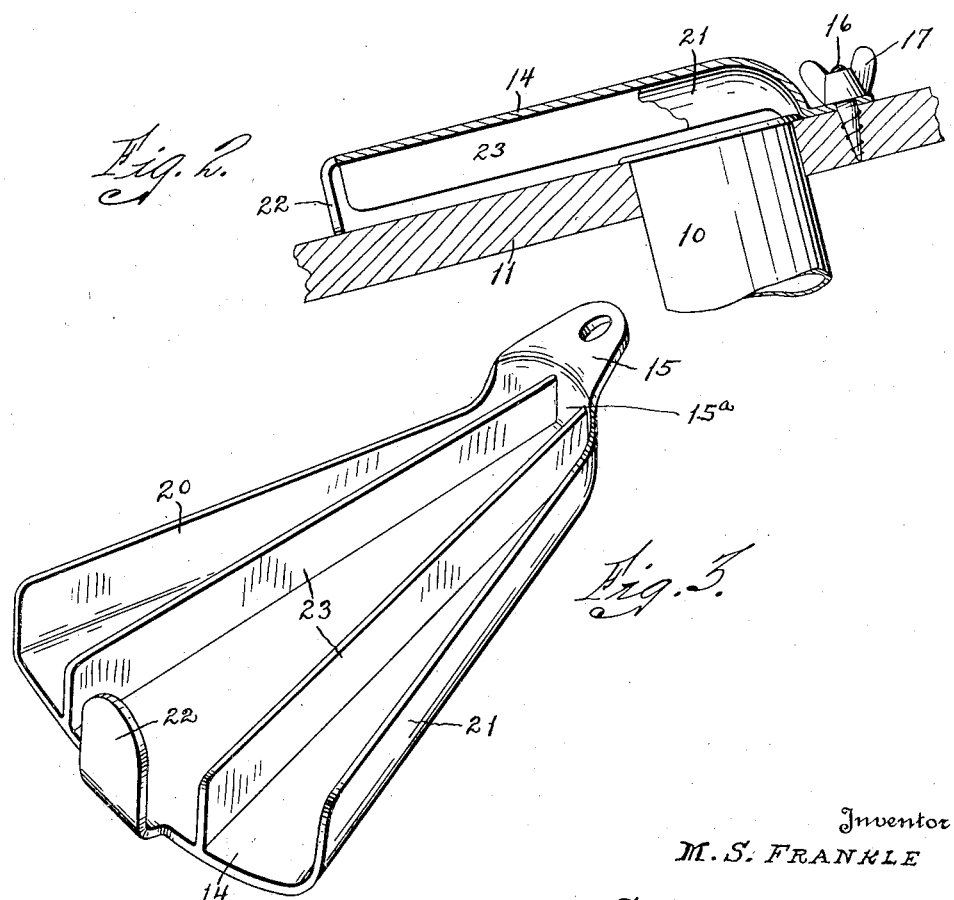
Inventor
M. S. FRANKLE
By Earl M. Sinclair
Attorney Patented Nov. 6, 1928.

1,690,723

UNITED STATES PATENT OFFICE.

MILTON S. FRANKLE, OF DES MOINES, IOWA.

DEFLECTOR FOR MOTOR-VEHICLE HOT-AIR HEATERS.

Application filed October 7, 1927. Serial No. 224,608.

The object of this invention is to provide an improved attachment adapted to be pivotally mounted in a position so as to overlie the vent of a hot-air heater such as is used in motor vehicles, whereby the heated air currents are deflected laterally instead of being discharged directly toward one of the occupants of the vehicle.

A further object is to provide a device of the class described which is very simple and economical of construction, easily installed and capable of use in the manner described so as to greatly increase the comfort and convenience of both occupants of the forward compartment of a motor vehicle.

With these and other objects in view, my invention consists in the construction, arrangement and combination of elements hereinafter set forth, pointed out in the claims and indicated by the accompanying drawing in which—

Fig. 1 is a plan view of a portion of the body of a motor vehicle, showing my improved attachment in position for practical use.

Fig. 2 is an enlarged section on the line 2—2 of Fig. 1.

Fig. 3 is a perspective view of the deflector, detached and in inverted position.

Many motor vehicles are now provided with heating devices which discharge a current of heated air through a pipe directly into the forward compartment which is occupied by the driver and arranged to accommodate one or more additional passengers usually seated at the right hand side of the driver. Ordinarily these devices have the vent pipe opening through the floor board, foot board, or dash on the right hand side of the vehicle so that the current of heated air is discharged directly toward the passenger or passengers, often to the intense discomfort of such passengers, while the driver receives very little benefit from such heated currents, particularly as to his legs and feet. It is the purpose of the present invention to provide means for deflecting these currents laterally so that they do not impinge directly upon the persons of the passengers and moreover are discharged in part toward the feet of the driver, thereby securing a double benefit.

In the accompanying drawing I have used the numeral 10 to designate a hot-air pipe of the heater device, which ordinarily receives atmospheric air at its forward end, causes the air to pass across the heated exhaust pipe of the motor, and leads it rearwardly into the body of the vehicle. In the present instance the pipe 10 is shown as opening through the inclined foot board 11 which is arranged between the vertical dash 12 and the horizontal floor board 13. The pipe 10 has its mouth arranged substantially flush with the foot board 11, and is ordinarily supplied with some suitable form of damper or valve (not shown) whereby the passage of air currents may be regulated or shut off. A deflector plate 14 is provided and at one end is formed with an offset lip 15 which is apertured to receive a bolt or stud 16 adapted to be seated in the support such as the foot board 11. I prefer to employ an adjustable fastening member such as a wing nut 17 on the bolt 16 so that it may be easily adjusted manually to permit adjustment of the deflector and then to hold it securely in adjusted position. The pivot 16 for the deflector is arranged near the mouth of the pipe 10 and on the right hand side thereof, that is to say on the side opposite to the foot pedals 18 and 19 of the vehicle. The body 14 of the deflector is adapted to extend over the mouth of the pipe 10 and in spaced relation thereto as shown in Figures 1 and 2, and said body preferably is substantially parallel with the support 11. The plate 14 has its side margins provided with downturned flanges 20 and 21 of less width than the space between the plate 14 and the support 11 so that their free edges are spaced from said support.

In practical use the device is mounted as shown and described and when arranged across the mouth of the pipe 10 it operates to spread and deflect the currents of heated air issuing from said pipe, so that the main body of such currents are directed in a general direction toward the foot pedals 18 and 19 or slightly rearwardly thereof as shown in Fig. 1. Other portions of such currents may emerge at the sides of the plate beneath the flanges 20 and 21 so that the heated air is deflected and distributed and will then naturally arise to the upper part of the compartment. It is obvious that the exact position of the deflector may be adjusted to suit the convenience of the occupants of the vehicle and in such manner as to best distribute the currents of heated air for the convenience of all concerned. At times the deflector may be swung entirely out of the way, by loosening the nut 17, as for instance when the heater is not in use or when it is desired to gain access to the controlling damper. I have provided means for supporting the free end of the plate 14, in this instance a lip 22 turned at substantially right angles to the body and adapted to contact with the support 11. The lip 22, or any similar means on the free end of the plate, is designed to slide freely on the support 11 when the deflector is adjusted and serves to maintain the plate 14 in proper spaced relation to the support 11. The lip 22 preferably is curved on its lower margin so that it will not catch on the support or any projections or floor coverings.

At times it may be desirable to form one or more partitions such as 23 within and longitudinally of the deflector body, as shown in Figure 3, for the purpose of better directing the hot air currents.

It is obvious that various modifications of form and structure may be employed and I do not desire to be limited to the exact construction and arrangement herein shown and described.

The portion between the body 14 and lip 15 forms a closure or wall 15ª for that end of the deflector and the side flanges 20 and 21 preferably diverge from said end wall so that the device is considerably wider at its free or open end.

I claim as my invention:

1. The combination with a motor vehicle having a body member and a heater pipe adapted to discharge heated currents of air therethrough, of a deflector plate arranged substantialy parallel with said body member and pivoted on an axis spaced from and substantially parallel with the axis of said pipe, said plate adapted to be arranged with its body portion spaced from the vehicle body member and extending across the mouth of said pipe.

2. The combination with a motor vehicle having a body member and a heater pipe adapted to discharge heated currents of air therethrough, of a deflector plate pivoted on an axis spaced from and substantially parallel with the axis of said pipe, said plate adapted to be arranged with its body portion spaced from and at all times substantially parallel with the vehicle body member and extending across the mouth of said pipe, said deflector plate being formed with flanges on some of its side margins projecting toward said vehicle body member.

3. The combination with a motor vehicle having a body member and a heater pipe adapted to discharge heated currents of air therethrough, of a deflector plate pivoted at one side of the mouth of said pipe and adapted to be arranged with its body portion spaced from the vehicle body member and extending across the mouth of said pipe, said deflector plate being formed at its free end with a supporting member adapted to engage and slide at times on said vehicle body member.

4. The combination with a motor vehicle having a body member and a heater pipe adapted to discharge heated air currents therethrough, of a deflector plate comprising a body portion, an integral lip offset relative to said body portion and adapted to contact with said vehicle body member, means for pivotally securing said lip to said vehicle body member at one side of the mouth of said pipe, whereby the body portion of said deflector may be arranged to extend across and in spaced relation to the mouth of said pipe and to deflect the heated air currents laterally.

5. The combination with a motor vehicle having a body member and a heater pipe adapted to discharge heated currents of air therethrough, of a deflector plate pivoted at one side of the mouth of said pipe and arranged with its body portion substantially parallel with and spaced from the vehicle body member and extending across the mouth of said pipe, said deflector plate being formed with flanges at its side margins projecting toward said vehicle body member, said body portion being formed with a supporting member engaging and adapted to slide at times on said vehicle body member.

MILTON S. FRANKLE.